US012617928B2

(12) United States Patent
Kanai et al.

(10) Patent No.: US 12,617,928 B2
(45) Date of Patent: May 5, 2026

(54) CARBONACEOUS FILLER-CONTAINING POLYOLS DISPERSION

(71) Applicant: SANYO TRADING CO., LTD., Tokyo (JP)

(72) Inventors: Takaaki Kanai, Tokyo (JP); Hiroyuki Uchino, Chiba (JP)

(73) Assignee: SANYO TRADING CO., LTD., Tokyo (JP)

( * ) Notice: Subject to any disclaimer, the term of this patent is extended or adjusted under 35 U.S.C. 154(b) by 600 days.

(21) Appl. No.: 18/300,389

(22) Filed: Apr. 14, 2023

(65) Prior Publication Data

US 2023/0272183 A1 Aug. 31, 2023

Related U.S. Application Data

(63) Continuation of application No. PCT/JP2022/035840, filed on Sep. 27, 2022.

(30) Foreign Application Priority Data

Oct. 29, 2021 (JP) ................................. 2021-177079

(51) Int. Cl.
| | |
|---|---|
| C08K 3/04 | (2006.01) |
| C08K 5/06 | (2006.01) |
| C08L 75/04 | (2006.01) |
| C09C 1/44 | (2006.01) |
| C09C 3/08 | (2006.01) |

(52) U.S. Cl.
CPC .................. *C08K 3/04* (2013.01); *C08K 5/06* (2013.01); *C08L 75/04* (2013.01); *C09C 1/44* (2013.01); *C09C 3/08* (2013.01); *C08K 2201/003* (2013.01); *C08K 2201/006* (2013.01)

(58) Field of Classification Search
CPC ...... C08K 3/04; C08K 5/06; C08K 2201/003; C08K 2201/006; C08L 75/04; C08L 71/00; C09C 1/44; C09C 3/08; C09C 1/56; C09C 3/10; C09D 17/00; C08G 18/48; C01B 32/05
See application file for complete search history.

(56) References Cited

U.S. PATENT DOCUMENTS

| | | | |
|---|---|---|---|
| 4,580,416 | A | 4/1986 | Sitte |
| 4,669,517 | A | 6/1987 | Kurishiyunan |
| 6,004,669 | A | 12/1999 | Rokutan |
| 2009/0220767 | A1 * | 9/2009 | Schlogl .................. B01J 23/745 |
| | | | 428/323 |
| 2018/0340074 | A1 | 11/2018 | Wittmann |
| 2019/0292347 | A1 | 9/2019 | Mori |

FOREIGN PATENT DOCUMENTS

| | | | | |
|---|---|---|---|---|
| CN | 102558828 | A | 7/2012 | |
| CN | 108485412 | A * | 9/2018 | ........... C09D 175/08 |
| CN | 108793119 | A | 11/2018 | |
| JP | S6123939 | A | 2/1986 | |
| JP | S6123939 | B2 | 6/1986 | |
| JP | H0137407 | B2 | 8/1989 | |
| JP | H0369301 | A | 3/1991 | |
| JP | H0369301 | B2 | 10/1991 | |
| JP | H1037407 | A | 2/1998 | |
| JP | H10101444 | A | 4/1998 | |
| JP | H10195166 | A | 7/1998 | |
| JP | H10195167 | A | 7/1998 | |
| JP | 3092533 | B2 | 9/2000 | |
| JP | 2007308582 | A | 11/2007 | |
| JP | 4343064 | B2 | 10/2009 | |
| JP | 4925744 | B2 | 5/2012 | |
| JP | 5120747 | B2 | 1/2013 | |
| JP | 2013147620 | A | 8/2013 | |
| JP | 2015196744 | A | 11/2015 | |
| JP | 2016119181 | A | 6/2016 | |
| JP | 2019503954 | A | 2/2019 | |
| JP | 6795040 | B2 | 12/2020 | |
| KR | 20170009287 | A | 1/2017 | |
| KR | 20210038376 | A | 4/2021 | |
| KR | 20210092392 | A | 7/2021 | |
| WO | 2020220047 | A1 | 10/2020 | |

OTHER PUBLICATIONS

CarbonNeat, "Neat 90: New Tool. New Possibilities." 2017, Carbon-Neat, pp. 1-16. (Year: 2017).*
International Search Report and (ISA/237) Written Opinion of the International Search Authority for International Patent Application No. PCT/JP2022/035840, mailed by the Japan Patent Office on Dec. 27, 2022.
Carbon Black Association, Handbook of Carbon Black, Apr. 15, 1995, p. 10-11.
Office Action issued for counterpart Japanese Application No. 2023-019773, issued by the Japanese Patent Office on Mar. 14, 2023 (drafted on Mar. 8, 2023).
International Search Report and Written Opinion (ISA/237) of the International Search Authority for International Patent Application No. PCT/JP2022/035845, mailed by the Japan Patent Office on Dec. 27, 2022.

* cited by examiner

*Primary Examiner* — Robert S Jones, Jr.
*Assistant Examiner* — Joshua Caleb Bledsoe

(57) ABSTRACT

A carbonaceous filler-containing polyols dispersion obtained by blending a carbonaceous filler with polyols, wherein the carbonaceous filler has a component content (anhydrous basis weight) with 80% or more fixed carbon, less than 8% volatile content, and less than 4% ash content by industrial analysis, the carbonaceous filler has a phenolic hydroxy group per external specific surface area of 0.005 mmol/m$^2$ or more, the carbonaceous filler is a carbon based material having an average particle diameter (D50) of 0.1 to 100 μm, and the carbonaceous filler-containing polyols dispersion is characterized by including 1 to 80 parts by weight of the carbonaceous filler with respect to 100 parts by weight of the polyols.

20 Claims, No Drawings

CARBONACEOUS FILLER-CONTAINING POLYOLS DISPERSION

The contents of the following Japanese patent application are incorporated herein by reference:

NO. 2021-177079 filed in JP on Oct. 29, 2021
NO. PCT/JP2022/035840 filed in WO on Sep. 27, 2022

BACKGROUND

1. Technical Field

The present invention relates to a polyols dispersion formed by dispersing a carbonaceous filler in polyols that are raw materials for resin or intermediates for resins such as polyurethane or the like without impairing properties such as electrical properties and colorability or the like possessed by the carbonaceous filler, and without using a dispersant.

2. Related Art

The polyols in the present invention are polyhydric alcohols that serve as raw materials or intermediates for resins and are used as raw material or intermediates for phenolic resin, urea resin, melamine resin, modified unsaturated polyester resin, alkyd resin, and epoxy resin in addition to polyurethane. Polyurethane is a product of reaction of polyols and polyisocyanates. It has excellent moldability, various forms and a wide range of mechanical properties, so it is used widely, such as for gravure ink, synthetic leather, elastomer, paint, adhesive, coating, cushioning material, or the like. On the other hand, polyurethane also has disadvantages such as being easily broken down by light and heat and being easily charged. In order to make up for these disadvantages, or to add various properties such as conductivity and reinforcement, a procedure of blending a carbonaceous filler has been performed in various uses.

A procedure of blending a carbonaceous filler has been performed in various uses for a similar purpose as for the polyurethane for phenolic resin, urea resin, melamine resin, modified unsaturated polyester resin, raw material for alkyd resin, and epoxy resin.

However, for example, even if a large amount of carbon black that is a representative carbonaceous filler is blended with polyurethane, since the dispersibility of carbon black and polyols is poor, typically, the upper limit of the blending amount is considered to be about 1%. This is because the carbon black surface has few functional groups that increase affinity with polyols and affinity with the polyols is not good, and particle diameter is small at several tens to several hundreds of nanometers and the carbon black aggregates together in the polyols.

Under these circumstances, various proposals have been made to disperse more carbon black that is a representative carbonaceous filler in polyols.

A procedure of blending a diene-based copolymer (rubber) or a diene polyol that is well compatible with carbon black has been proposed (for example, Patent Documents 1 and 3).

A procedure of adding a dispersant such as a surfactant or the like, a modifying component, or an active component based on a pigment resin dispersion technique to a raw material for polyurethane has also been proposed (for example, Patent Documents 2, 4, 5, 6, and 8). However, when the dispersion or the like is diluted with polyols or mixed with isocyanates, the dispersibility may not be maintained, and the stability in the polyurethane may be impaired. Due to influence of dispersants or the like, there is a risk that expected properties such as weather resistance, conductivity, and reinforcement or the like obtained by fine uniform dispersion may not be sufficiently exhibited by adding carbon black, and there is a concern about clouding of the surface due to bleed out.

A procedure for modifying the surface of carbon black has also been proposed (for example, Patent Document 7). However, since it is required to cause a chemical reaction with the surface of the carbon black that is inherently low in reactivity and inactive, the cost is greatly increased, and only a part of the carbon black surface is modified. Therefore, there is still a limit to the amount of carbon black that can be uniformly dispersed in polyol.

Note that general carbon black has a specific gravity of 1.5 times or more that of polyols, and it is required to consider the mixing/stirring operation and the storage ability to allow for the difference in specific gravity.

PRIOR ART DOCUMENTS

Patent Documents

Patent Document 1: Japanese Patent Application Publication No. H 1-37407
Patent Document 2: Japanese Patent Application Publication No. S 61-23939
Patent Document 3: Japanese Patent Application Publication No. H 3-69301
Patent Document 4: Japanese Patent No. 3092533
Patent Document 5: Japanese Patent No. 4343064
Patent Document 6: Japanese Patent No. 4925744
Patent Document 7: Japanese Patent No. 5120747
Patent Document 8: Japanese Patent No. 6795040

Therefore, the present inventors have performed intensive research on the form of a carbonaceous filler that represents good dispersibility in polyols without chemically changing the surface or using a dispersant or the like that may impair the original properties of the carbonaceous filler, and they have found that that purpose can be achieved by blending a particular carbonaceous filler with polyols and completed the present invention.

GENERAL DISCLOSURE

That is, the present invention provides a carbonaceous filler-containing polyols dispersion obtained by blending a carbonaceous filler with polyols. Further, the present invention provides a thermosetting resin in which a carbonaceous filler is dispersed. Further, the present invention provides a polyurethane in which a carbonaceous filler is dispersed. The carbonaceous filler may have a component content (anhydrous basis weight) with 80% or more fixed carbon, less than 8% volatile content, and less than 4% ash content by industrial analysis as defined in JIS-M 8812:2004. The carbonaceous filler may have a phenolic hydroxy group per external specific surface area of 0.005 mmol/m$^2$ or more. The carbonaceous filler may be a carbon based material having an average particle diameter (D50) of 0.1 to 100 μm.

In the above-described, the carbonaceous filler may have a carboxyl group per external specific surface area of 0.001 mmol/m$^2$ or less.

In the above-described, the carbonaceous filler may have a true specific gravity of 1.5 or less.

In the above-described, the carbonaceous filler may be dispersed in polyols without using a dispersant.

In the above-described, the carbonaceous filler may be a carbonaceous material selected from bio carbons.

In the above-described, the carbonaceous filler may be a bio raw material mainly composed of lignin/cellulose/hemi-cellulose or a carbonaceous material obtained by carbonizing low carbonization lignite at 1000° C. or less.

In the above-described, the carbonaceous filler may carry carbon black on the carbonaceous material.

In the above-described, 1 to 80 parts by weight of the carbonaceous filler may be included with respect to 100 parts by weight of the polyols.

The present invention may further provide a polyurethane obtained by reacting the above-described polyols dispersion with polyisocyanates.

The present invention may further provide a thermosetting resin obtained by reacting the above-described polyols dispersion as a raw material.

The present invention may be a polyurethane obtained by mixing the above-described polyols dispersion with one or more types of polyols selected from a group formed of polyester polyol, polyether polyol, polycarbonate polyol, polymer polyol, a modified product or mixture thereof, or prepolymer obtained by partially polymerizing them, and reacting the above-described polyols dispersion with polyisocyanates.

In the present invention, the above-described polyols dispersion may be a phenolic resin, a modified material thereof and an intermediate thereof, an intermediate of urea resin and melamine resin, a modified unsaturated polyester resin intermediate, a bisphenol A-type prepolymer or urethane prepolymer of raw material for alkyd resin and raw material for epoxy resin.

According to the present invention, since the carbonaceous filler includes many phenolic hydroxy groups in the surface functional groups, the carbonaceous filler-containing polyols dispersion can exhibit good dispersibility with respect to polyols, easily blend large amounts of carbonaceous filler in polyurethane without using a dispersant, and more strongly exhibit various properties expected of the carbonaceous filler such as mechanical properties, weather resistance, antistatic properties, colorability, and conductivity as a thermosetting resin such as polyurethane or the like. The carbonaceous filler-containing polyols dispersion of the present invention can be handled in a similar manner as single polyols without any special improvement in the process, can be diluted without restriction and used, and is suitably used as raw material for carbonaceous filler-containing thermosetting resin, in particular raw material for carbonaceous filler-containing polyurethane.

DESCRIPTION OF EXEMPLARY EMBODIMENTS

In the carbonaceous filler-containing polyols dispersion of the present invention, the carbonaceous filler is a carbon based material having a component content (anhydrous basis) with 80% or more fixed carbon, less than 8% volatile content, and less than 4% ash by industrial analysis, a phenolic hydroxy group (Ph-type OH) per external specific surface area of 0.005 mmol/m² or more, and an average particle diameter (D50) of 0.1 to 100 μm.

In the carbonaceous filler-containing polyols dispersion of the present invention, the carbonaceous filler is a carbon based material that fulfills the physical properties described above, and a material obtained by carrying carbon black with this carbon based material as a carrier is also used. That is, in the present invention, the carbonaceous filler may be either one that does not carry carbon black or one that does carry carbon black.

A carbon based particle used as the carbonaceous filler in the present invention has a six-membered carbon ring that has developed to some extent in its chemical structure, and it is effective in that a hydroxy group that has a high affinity to polyols is directly bonded to the six-membered carbon ring. This is completely different from a technique in which a carboxyl group (COOH) is effective as a surface property for dispersing in water or the like.

In the present invention, an abundance (mmol/m²) of phenolic hydroxy groups (Ph-type OH) per external surface area (referred to as "external specific surface area" in the present description) excluding the specific surface area of micropores defined as a statistical thickness specific surface area (STSA) defined in any of standards JIS K6217-7. ISO18852, and ASTM D6556, is made an indicator.

This functional group amount per external specific surface area is an indicator representing the functional group amount of the carbonaceous filler surface. This indicator is calculated from a measurement of total acidic functional group amount and strongly acidic functional group amount using the Boehm method of acid-base titration and a measurement of external specific surface area STSA. Herein, strictly speaking, it is the phenolic hydroxy group and not the alkyl hydroxy group that is sought by the Boehm method. That is, it is a value obtained by taking the strongly acidic functional group amount as the amount of carboxyl groups (COOH), taking the difference between the total acidic functional group amount and the strongly acidic functional group amount as the phenolic hydroxy group amount, and dividing it by the external specific surface area STSA.

The phenolic hydroxy group amount (Ph-type OH) should be 0.005 mmol/m² or more per external specific surface area, and the amount of carboxyl groups (COOH) is desirably 0.001 mmol/m² or less per external specific surface area.

The phenolic hydroxy group amount per external specific surface area is preferably 0.010 mmol/m² or more. Although an upper limit is not limited in particular from the standpoint of affinity with polyols, it is expected that production will be difficult if it exceeds about 0.10 mmol/m² in terms of mass production.

The external specific surface area (STSA) of the carbonaceous material may be 0.01 to 100 m²/g, and preferably 0.1 to 10 m²/g. More desirably, it may be 0.3 to 5 m²/g.

The carbon based particle used as the carbonaceous filler in the present invention has an average particle diameter (D50) of 0.1 μm or more and 100 μm or less, preferably 1 μm or more and 20 μm or less that is a 50% integrated value of volume-based particle diameters measured with a disc centrifugal particle size distribution measuring device. When the average particle diameter (D50) is less than this, aggregation tends to occur, and when it is larger than this, uniformity is impaired. The average particle diameter (D50) may be, for example, measured by a disc centrifugal particle size distribution measuring apparatus Model DC24000UHR from CPS Instruments.

It is desirable that the carbon based particle used as the carbonaceous filler should have an anhydrous basis weight of 80% or more fixed carbon and less than 8% volatile content by industrial analysis as defined by JIS-M 8812: 2004 in order to sufficiently demonstrate performance as a filler. Since ash content does not contribute to the performance as a filler, it is desirable that it should be less than 4%. Material with volatile content of 8% or more cannot be applied because the six-membered carbon ring is underdeveloped and there are many hydrocarbon (CH) parts that do not exhibit properties as a carbonaceous filler. Preferably, fixed carbon should be 85% or more, more preferably, fixed carbon should be 90% or more.

To allow for dispersion in polyols, true specific gravity is desirably 1.50 or less because the closer it is to the specific gravity of polyols (about 1.00 to 1.30), the better the long term dispersion stability.

Various carbonaceous materials can be used as the carbonaceous filler in the present invention as long as it has the properties described above. Preferably, it is selected from charcoal, graphite, graphene, bio carbon (Biochar) or coal. Bio carbon is carbonaceous material that is organic material (Biomass) such as agricultural and forestry waste, wood waste, food waste, or the like that has been carbonized.

For example, carbonaceous material obtained by low temperature carbonization at 1000° C. or less, desirably 800° C. or less, of bio raw material mainly composed of lignin/cellulose/hemicellulose or low carbonization lignite coal (Australian lignite or the like) are mentioned.

The carbonaceous material may be obtained by introducing a phenolic hydroxy group to carbon material of relatively high purity such as coal, graphite, or graphene. For example, as a method of introducing a phenolic hydroxy group, oxygen plasma irradiation, UV and/or ozone oxidation treatment, ion beam irradiation, vapor phase oxidation using gas, and liquid phase oxidation using acid, hydrogen peroxide, or the like may be used.

In a method of oxidizing carbon material of high purity such as carbon black or the like, it is difficult to selectively generate phenolic hydroxy groups while suppressing generation of carboxyl groups, and the oxidation reaction may impair the properties of the carbon material. Thus, since the method of low temperature carbonization of bio raw material or low carbonization lignite coal (Australian lignite or the like) that are organic material already having oxygen-containing groups can relatively easily control generation of functional groups and obtain the carbonaceous material of the present invention, it is typically preferred.

In the present invention, when the carbonaceous filler is obtained by carrying carbon black, the carbon black can use any of furnace black, thermal black, channel black or the like, without restriction in particular. The carbonaceous material can add basic physical properties as a carbonaceous filler such as weather resistance, antistatic properties, reinforcement, colorability, or the like, and it can also add various properties that each carbon black has such as conductivity or the like.

Carbon black having an average particle diameter (arithmetic mean diameter by microscopic observation) of preferably 0.01 to 0.3 μm (10 to 300 nm) is used. In measurement using an electron microscope, the diameter may be measured by irradiating a circular spotlight that can be changed in circular diameter onto a peripheral part of a particle in the image measured by the electron microscope. For example, in order to eliminate error, measurement may be made by taking in all images showing ⅓ of the circumference and selecting a plurality of images so that the number of particles to be measured is 500 or more, desirably 1000 or more. Carbon black having a primary particle size of less than 0.01 μm is difficult to carry due to a large cohesive force acting between particles, and on the other hand, when it exceeds 0.3 μm, the number of contact points with the carrier carbonaceous material is reduced, also making it difficult to carry. More preferably, it is 0.015 to 0.20 μm (15 to 200 nm). Regarding other physical properties, although not particularly limited, are, for example, nitrogen adsorption specific surface area ($N_2SA$) of 10 to 200 $m^2/g$, DBP absorption of 20 to 200 mL/100 g, volatile content of less than 10%, and ash content of less than 1.0%.

In the carbonaceous filler of the present invention, the ratio of carbon black to be carried is in a range of preferably 1 part by weight or more and 200 parts by weight or less, more preferably 1 part by weight or more and 100 parts by weight or less, further preferably 1 part by weight or more and 50 parts by weight or less, with respect to 100 parts by weight of the carbonaceous material as a carrier. If the content of carbon black is less than this, the effect of adding carbon black will be insufficient. On the other hand, if it exceeds this range it becomes difficult to carry, and there is a concern that carbon black that is not carried causes poor dispersion.

Whether carbon black is carried on the carbonaceous filler can be easily visually confirmed by, for example, whether the carbon black settles or aggregates in the polyol liquid when the carbonaceous filler is dispersed in the polyol liquid, or the like.

In the carbonaceous filler of the present invention, the carrying of the carbon black is performed by mechanically bringing the carbonaceous material as a carrier in contact with the carbon black. When carbon-based particles in which six-membered carbon rings are developed are brought into contact with each other, strong irreversible bonds are formed between the particles. For example, it can be performed by mechanically applying strong pressure to the particles by using an automatic mortar, ball mill, crusher, or the like.

The carbonaceous filler-containing polyols dispersion of the present invention is obtained by blending the carbonaceous filler described above with polyols.

In general, polyols are used as raw material for polyurethane and other thermosetting resin, and without restriction in particular, polyols for urethane include polyester polyols, polyether polyols, polycarbonate polyols, polymer polyols, or the like. A modified product or mixture thereof, or a prepolymer obtained by partially polymerizing them may be used.

The polyols may be a phenolic resin, a modified material thereof and an intermediate thereof, an intermediate of urea resin and melamine resin, a modified unsaturated polyester resin intermediate, a bisphenol A-type prepolymer or urethane prepolymer of raw material for alkyd resin and raw material for epoxy resin.

When a large amount of the carbonaceous filler of the present invention is mixed with polyols, it is preferable to select one having a viscosity that allows for workability.

The carbonaceous filler-containing polyols dispersion of the present invention can be obtained by mixing the carbonaceous filler with polyols in an arbitrary ratio. Practically, the content of carbonaceous filler is preferably in a range of 1 to 80% by weight, more preferably in a range of 5 to 70% by weight. If it is less than this, it may be diluted when mixed with the polyols and isocyanates of raw material for polyurethane, and the content of the carbonaceous filler and carbon black may further decrease, making it difficult to exhibit the properties of the carbonaceous filler and carbon black. On the other hand, if it exceeds this range, uniform mixing becomes difficult and may not be practical.

Phenolic resins, urea resins, melamine resins, modified unsaturated polyester resins, alkyd resins and epoxy resin are also blended in the range of 1 to 80% by weight, more preferably in a range of 5 to 70% by weight, in consideration of becoming diluted by mixing with other raw material.

The carbonaceous filler-containing polyols dispersion of the present invention can be used as polyols as raw material for resin such as polyurethane or the like as it is, mixed with a predetermined amount of raw material such as polyisocyanates or the like, auxiliary raw material according to what is required, for example, a catalyst, foam stabilizer, foaming agent, cross-linking agent, or the like, and cured to obtain a resin product such as polyurethane or the like having a high carbonaceous filler content. A flame retardant, filler, colorant, stabilizer, release agent, or the like may be blended according to another purpose and application. A solvent may be used for dilution or the like.

The carbonaceous filler-containing polyols dispersion of the present invention can be used as a masterbatch, this masterbatch dispersion can be mixed with polyols, blended with raw material of polyisocyanates or the like, and cured to obtain a resin product such as a polyurethane product or the like of a desired carbonaceous filler content.

A resin product such as polyurethane or the like that is obtained in this way has a high carbonaceous filler content due to fine uniform dispersion, and since it can sufficiently exhibit various properties such as weather resistance, antistatic properties, colorability, conductivity, reinforcement, or the like due to containing the carbonaceous filler, it can be suitably used for various applications such as an ink, synthetic leather, elastomer, paint, adhesive, coating material, cushioning material, or the like.

EXAMPLE

Below, the present invention is described in detail with reference to an example.

For the carbonaceous filler, the carbonaceous material below was used.

Carbonaceous Material CC1: Pulverized Charcoal Product Derived from Pine Wood Carbonized at 550° C. (Manufactured by CarbonNeat, Sanyo Trading Sales "Neat90")

Average particle diameter (D50) 5 μm
 External specific surface area (STSA) 1 m²/g
 True specific gravity 1.12
 Industrial analysis of fixed carbon 96.1%, volatile content 1.8%, ash content 2.1%, (anhydrous basis weight)
 Ph-type OH group amount per external specific surface area: 0.080 mmol/m²
 COOH group amount per external specific surface area: measurement limitation or less Carbonaceous Material CC2: Pulverized Charcoal Product Derived from Mixed Wood Carbonized at 600° C.

Average particle diameter (D50) 5 μm
 External specific surface area (STSA) 0.5 m²/g
 True specific gravity 1.1
 Industrial analysis of fixed carbon 90.3%, volatile content 2.5%, ash content 7.2% (anhydrous basis weight)
 Ph-type OH group amount per external specific surface area 0.005 mmol/m²
 COOH group amount per external specific surface area: measurement limitation or less For the carbon black, the materials below were used.

Carbon Black CB1: Grade Equivalent of "N220"

Average particle diameter (D50) 0.02 μm (20 nm)
 True specific gravity 1.8 to 1.9
 Volatile content 1.0%, ash content 0.03%
 Nitrogen adsorption specific surface area (N2SA) 120 m²/g
 External specific surface area (STSA) 106 m²/g
 DBP absorption 114 mL/100 g Ph-type OH group amount per external specific surface area: 0.00085 mmol/m²
 COOH group amount per external specific surface area: 0.00028 mmol/m²

Carbon Black CB2: Grade Equivalent of "N990"

Average particle diameter (D50) 0.3 μm (300 nm)
 True specific gravity 1.9
 Volatile content 0.5%, ash content 0.1%
 Nitrogen adsorption specific surface area (N2SA) 8 m²/g
 External specific surface area (STSA) 8 m²/g
 DBP absorption 40 mL/100 g
 Ph-type OH group amount per external specific surface area: 0.00025 mmol/m²
 COOH group amount per external specific surface area: measurement limitation or less

Synthesis Example 1

20 g of carbonaceous material "CC2" and 4 g of carbon black "CB1" were placed in a mortar, and the particles were brought into contact with each other under a pressure of 2 kg for 10 minutes to obtain a carbon black-carrying carbonaceous filler used in Example 9.

Synthesis Example 2

40 g of carbonaceous material "CC1" and 8 g of carbon black "CB2" were placed in a mortar, and the particles were brought into contact with each other under a pressure of 2 kg for 10 minutes to obtain a carbon black-carrying carbonaceous filler used in Example 10.

Examples 1 to 10, Comparative Examples 1 to 4

A carbonaceous filler and carbon black CB1 and CB2 for comparison were used, blended with polyols, and after dispersibility was confirmed, they were blended with polyisocyanates for Examples 5 to 8 to produce polyurethane.

For polyols and polyisocyanates, the materials below were used.

Polyol B1: Polyether polyol "P-3000" manufactured by ADECA

Polyol B2: Foam urethane resin for casting A liquid polyol manufactured by Nissin Resin Polyol B3: Urethane resin for casting "Gummy Cast" A liquid polyol manufactured by Nissin Resin Polyisocyanate C1: Foam urethane resin for casting B liquid diisocyanate manufactured by Nissin Resin Polyisocyanate C2: Polyurethane resin for casting "Gummy Cast" B liquid modified isocyanate manufactured by Nissin Resin According to the formulation shown in Table 1, the polyol and the carbonaceous filler were put in order into a 500 mL polyethylene beaker and stirred with a glass rod for 3 minutes. For Examples 8 to 10, after stirring for 3 minutes, a predetermined amount of polyisocyanates was added, further stirred for 1 minute, and allowed to stand at room temperature.

The dispersibility of the carbonaceous filler in the polyols was evaluated according to the following criteria.

◎: It has flowability and is dispersed well.

o: Although there is an increase in viscosity and there is no flowability, it is dispersed.

x: Gel-like and undispersed lumps are generated, and it does not disperse.

xx: It separates and settles from the polyols, and it does not disperse.

In both Examples 9 and 10, when the carbonaceous filler was dispersed in the polyol liquid, the carbon black did not settle or aggregate in the polyol liquid, and it could be confirmed that the carbon black was carried on the carbonaceous material.

The polyurethane produced in Examples 5 to 8 were molded and evaluated for appearance according to the criteria below.

o: Aggregation derived from the carbon black could not be confirmed at all, and the appearance was good.

Δ: Slight aggregation could be confirmed, but there was no problem in practical use and appearance.

x: Aggregation of carbon black occurred.

7. The carbonaceous filler-containing polyols dispersion according to claim 1, wherein the carbonaceous filler is obtained by carrying carbon black on a carbonaceous material.

8. The carbonaceous filler-containing polyols dispersion according to claim 1, wherein 1 to 80 parts by weight of the carbonaceous filler is included with respect to 100 parts by weight of the polyols.

9. A thermosetting resin obtained by reacting the polyols dispersion according to claim 1 as a part or all of raw materials.

10. A phenolic resin, urea resin, melamine resin, modified unsaturated polyester resin, raw material for alkyd resin, or

| | EX-AM-PLE 1 | EX-AM-PLE 2 | EX-AM-PLE 3 | EX-AM-PLE 4 | EX-AM-PLE 5 | EX-AM-PLE 6 | EX-AM-PLE 7 | EX-AM-PLE 8 | EX-AM-PLE 9 | EX-AM-PLE 10 | COMPAR-ATIVE EXAM-PLE 1 | COMPAR-ATIVE EXAM-PLE 2 | COMPAR-ATIVE EXAM-PLE 3 | COMPAR-ATIVE EXAM-PLE 4 |
|---|---|---|---|---|---|---|---|---|---|---|---|---|---|---|
| CARBONACEOUS MATERIAL CC1 | 40 | 60 | 100 | | 60 | | 60 | 100 | | 40 | | | | |
| CARBONACEOUS MATERIAL CC2 | | | | 100 | | 60 | | | 20 | | | | | |
| CB 1 | | | | | | | | | 4 | | 20 | | 10 | |
| CB 2 | | | | | | | | | | 8 | | 20 | | 4 |
| POLYOL B1 | 100 | 100 | 100 | 100 | | | | 100 | 100 | | 100 | 100 | | 100 |
| POLYOL B2 | | | | | 100 | 100 | | | | | | | 100 | |
| POLYOL B3 | | | | | | | 100 | 100 | | | | | | |
| CARBONACEOUS FILLER DISPERSION | B1 | B2 | B3 | B4 | B5 | B6 | B7 | B8 | B9 | B10 | B11 | B12 | B13 | B14 |
| POLYISOCYANATE C1 | | | | | 40 | 40 | | | | | | | | |
| POLYISOCYANATE C2 | | | | | | | 40 | 40 | | | | | | |
| DISPERSIBILITY | ⊚ | ⊚ | ⊚ | ⊚ | ⊚ | ⊚ | ○ | ○ | ⊚ | ⊚ | X | X | X | XX |
| MOLDED PRODUCT APPEARANCE | — | — | — | — | ○ | ○ | ○ | Δ | — | — | — | — | — | — |

What is claimed is:

1. A carbonaceous filler-containing polyols dispersion obtained by blending a carbonaceous filler with polyols, wherein the carbonaceous filler has a component content (anhydrous basis weight) with 80% or more fixed carbon, less than 8% volatile content, and less than 4% ash content, the carbonaceous filler has a phenolic hydroxy group per external specific surface area of 0.005 mmol/m$^2$ or more, the carbonaceous filler is a carbon based material having an average particle diameter (D50) of 0.1 to 100 μm, and the carbonaceous filler carries carbon black on a carbonaceous material.

2. The carbonaceous filler-containing polyols dispersion according to claim 1, wherein the carbonaceous filler has a carboxyl group per external specific surface area of 0.001 mmol/m$^2$ or less.

3. The carbonaceous filler-containing polyols dispersion according to claim 1, wherein the carbonaceous filler has a true specific gravity of 1.5 or less.

4. The carbonaceous filler-containing polyols dispersion according to claim 1, wherein the carbonaceous filler is dispersed in the polyols without using a dispersant.

5. The carbonaceous filler-containing polyols dispersion according to claim 1, wherein the carbonaceous filler is a carbonaceous material selected from bio carbons.

6. The carbonaceous filler-containing polyols dispersion according to claim 1, wherein the carbonaceous filler is a bio raw material mainly composed of lignin/cellulose/hemicellulose or a carbonaceous material obtained by carbonizing low carbonization lignite at 1000° C. or less.

epoxy resin obtained by reacting the polyols dispersion according to claim 1 as a part or all of raw materials.

11. A polyurethane obtained by mixing the polyols dispersion according to claim 1 with one or more types of polyols selected from a group formed of polyester polyol, polyether polyol, polycarbonate polyol, polymer polyol, a modified product or mixture thereof, and reacting with polyisocyanates.

12. A thermosetting resin in which a carbonaceous filler is dispersed, wherein the carbonaceous filler has a component content (anhydrous basis weight) with 80% or more fixed carbon, less than 8% volatile content, and less than 4% ash content, the carbonaceous filler has a phenolic hydroxy group per external specific surface area of 0.005 mmol/m$^2$ or more, the carbonaceous filler is a carbon based material having an average particle diameter (D50) of 0.1 to 100 μm, and the carbonaceous filler carries carbon black on a carbonaceous material.

13. The thermosetting resin according to claim 12, wherein the carbonaceous filler has a carboxyl group per external specific surface area of 0.001 mmol/m$^2$ or less.

14. The thermosetting resin according to claim 12, wherein the carbonaceous filler has a true specific gravity of 1.5 or less.

15. The thermosetting resin according to claim 12, wherein a dispersant is not included.

16. The thermosetting resin according to claim 12, wherein the carbonaceous filler is a carbonaceous material selected from bio carbons.

17. The thermosetting resin according to claim 12, wherein the carbonaceous filler is a bio raw material mainly composed of lignin/cellulose/hemicellulose or a carbonaceous material obtained by carbonizing low carbonization lignite at 1000° C. or less.

18. The thermosetting resin according to claim 12, wherein the carbonaceous material is selected from bio carbons.

19. The thermosetting resin according to claim 12, wherein the thermosetting resin is phenolic resin, urea resin, melamine resin, modified unsaturated polyester resin, raw material for alkyd resin, or epoxy resin.

20. The thermosetting resin according to claim 12, wherein the thermosetting resin is polyurethane.

* * * * *